United States Patent
Van Gerwen

(10) Patent No.: US 9,930,864 B2
(45) Date of Patent: Apr. 3, 2018

(54) FEED-MIXING WAGON AND METHOD FOR REPLACING A COVERING OF A FEED-MIXING WAGON

(71) Applicant: LELY PATENT N.V., Maassluis (NL)

(72) Inventor: Joop Van Gerwen, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 444 days.

(21) Appl. No.: 14/773,674

(22) PCT Filed: Feb. 3, 2014

(86) PCT No.: PCT/NL2014/050061
§ 371 (c)(1),
(2) Date: Sep. 8, 2015

(87) PCT Pub. No.: WO2014/148890
PCT Pub. Date: Sep. 25, 2014

(65) Prior Publication Data
US 2016/0021847 A1    Jan. 28, 2016

(30) Foreign Application Priority Data
Mar. 20, 2013  (NL) .................................... 2010485

(51) Int. Cl.
*A01K 5/00* (2006.01)
*B01F 15/00* (2006.01)
(Continued)

(52) U.S. Cl.
CPC .............. *A01K 5/004* (2013.01); *A01K 5/001* (2013.01); *A01K 5/002* (2013.01); *B01F 7/162* (2013.01);
(Continued)

(58) Field of Classification Search
CPC ........ A01K 5/004; A01K 5/001; A01K 5/002; B01F 15/00837; B01F 7/245; B01F 7/162;
(Continued)

(56) References Cited

U.S. PATENT DOCUMENTS

| | | | |
|---|---|---|---|
| 8,651,408 B1* | 2/2014 | Fox ...................... | A01K 5/004 241/261.1 |
| 2011/0062261 A1* | 3/2011 | Milam ................... | A01K 5/004 241/101.74 |

FOREIGN PATENT DOCUMENTS

| | | |
|---|---|---|
| DE | 20 2007 015 580 U1 | 1/2008 |
| DE | 20 2008 014 820 U1 | 1/2009 |
| EP | 2 022 324 A2 | 2/2009 |

* cited by examiner

*Primary Examiner* — Anshu Bhatia
(74) *Attorney, Agent, or Firm* — Birch, Stewart, Kolasch & Birch, LLP

(57) ABSTRACT

A feed-mixing wagon includes a container for receiving feed. The container includes a bottom, and a peripheral wall which is closed off at a bottom end by the bottom. A mixing element is provided for mixing the feed to be accommodated in the container. The peripheral wall is provided with a wall covering which extends at least along a bottom, ring-shaped part of the inner surface of the peripheral wall. The wall covering includes a plurality of wall plate parts with upwardly extending side edges. Two adjoining side edges of at least two respective adjoining wall plate parts are clamped to the inner surface of the peripheral wall by clamping strips which overlap these adjoining side edges and which are attached to the peripheral wall of the container by means of detachable fasteners.

20 Claims, 5 Drawing Sheets

(51) Int. Cl.
*B01F 7/24* (2006.01)
*B01F 7/16* (2006.01)
*B01F 13/00* (2006.01)

(52) U.S. Cl.
CPC .......... *B01F 7/245* (2013.01); *B01F 13/0037* (2013.01); *B01F 15/00831* (2013.01); *B01F 15/00837* (2013.01); *B01F 2215/0008* (2013.01)

(58) Field of Classification Search
CPC ............ B01F 13/0037; B01F 15/00831; B01F 2215/0008
See application file for complete search history.

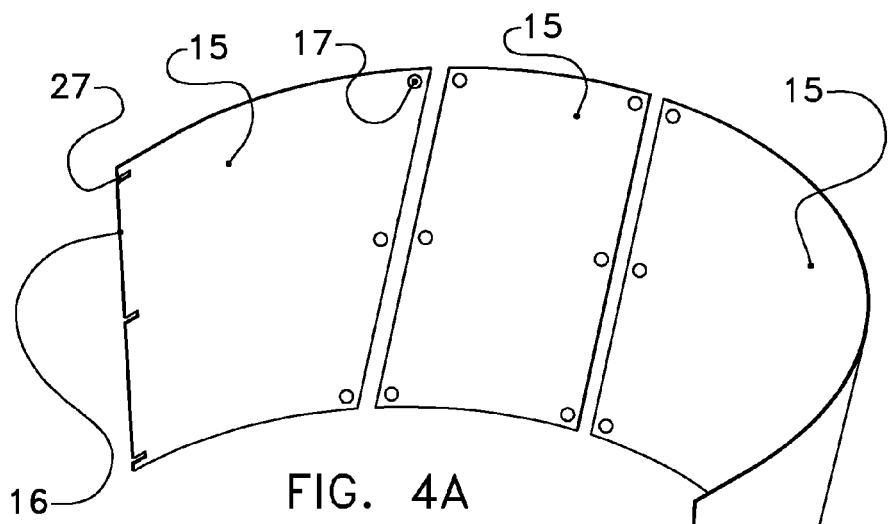
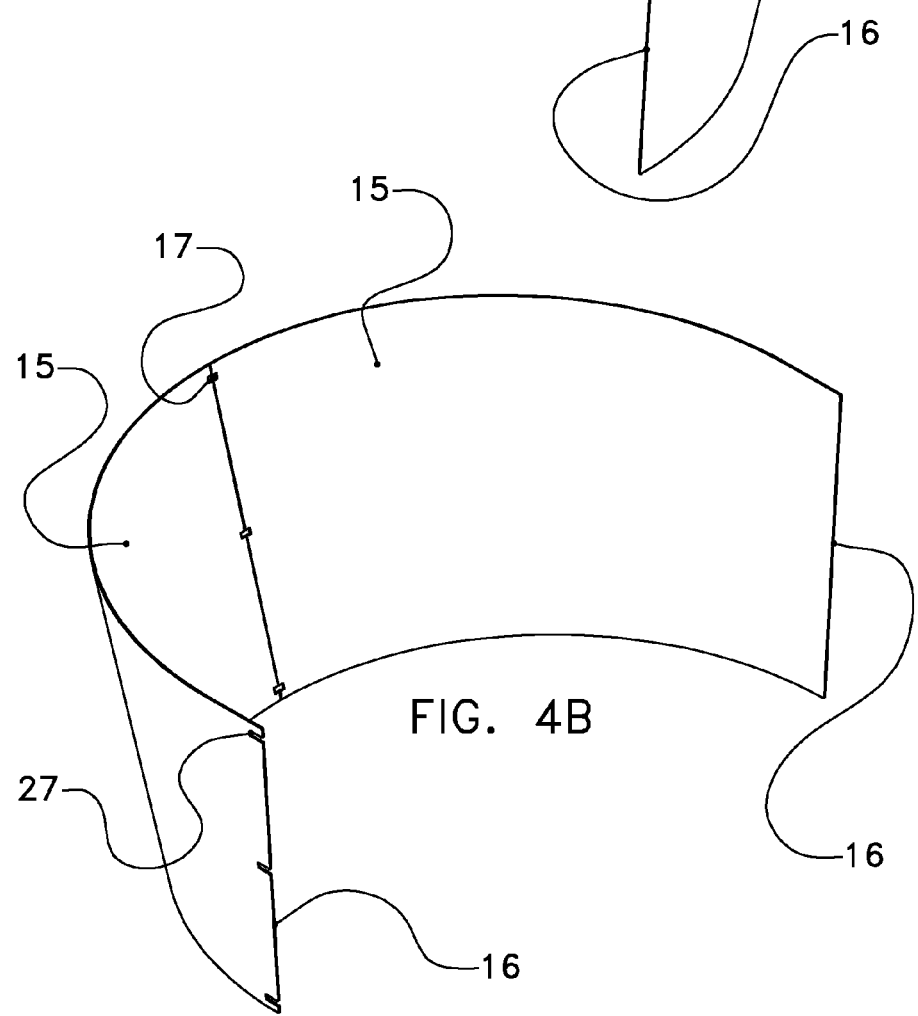

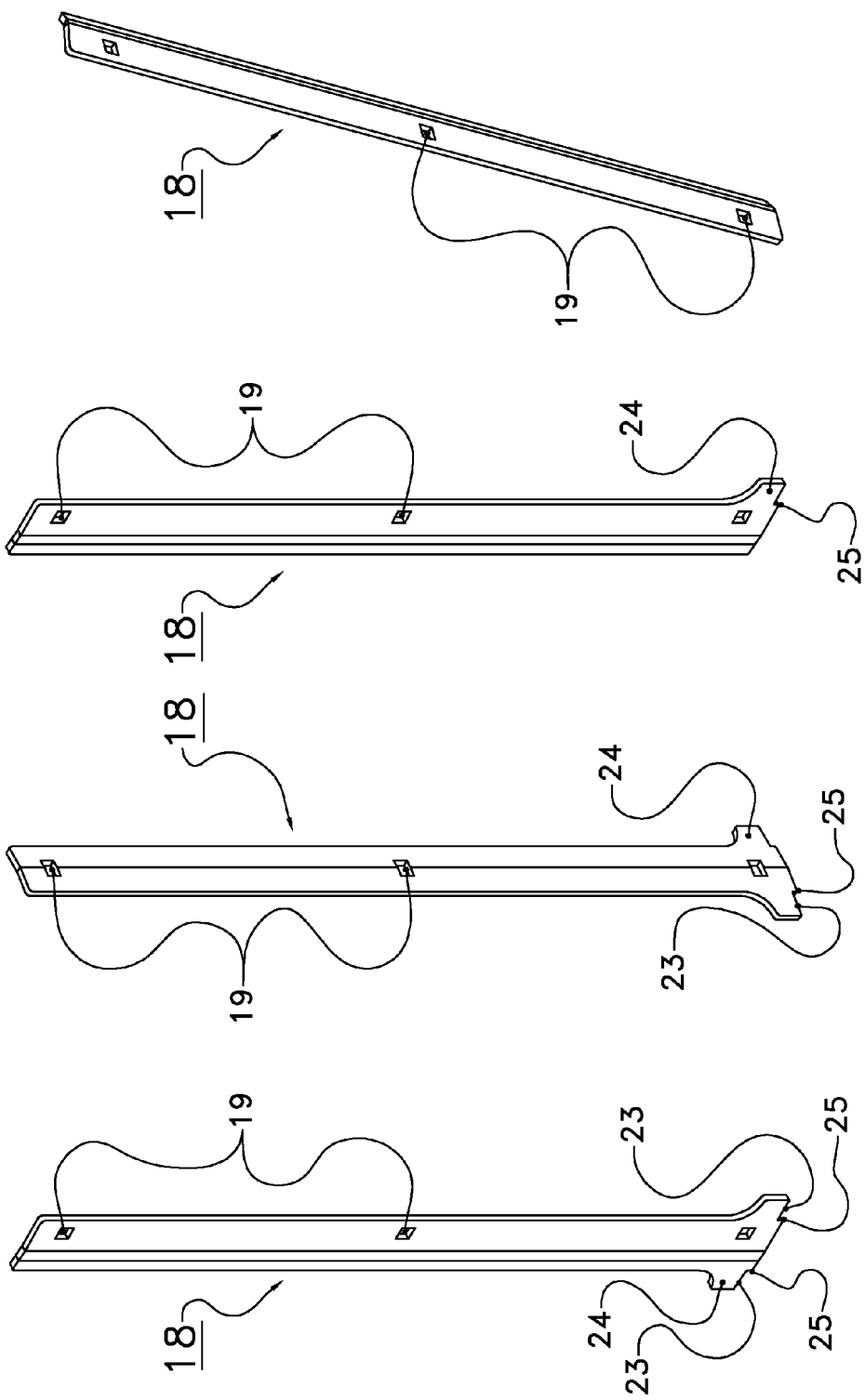

FEED-MIXING WAGON AND METHOD FOR REPLACING A COVERING OF A FEED-MIXING WAGON

The invention relates to a feed-mixing wagon, comprising:

a container for receiving feed, which container is provided with a bottom, and a peripheral wall which is closed off at a bottom end by the bottom, wherein the container is provided, at a top end situated opposite the bottom with a supply opening for supplying feed to the container, wherein the bottom and the peripheral wall each comprise an inner surface which extends in the container, wherein the peripheral wall is provided with a wall covering which extends at least along a bottom, ring-shaped part of the inner surface of the peripheral wall, wherein the wall covering comprises a plurality of wall plate parts, and wherein the bottom is provided with a bottom covering which extends substantially across the entire inner surface of the bottom, wherein the bottom covering comprises at least one bottom plate part which is releasably attached to the bottom of the container, a mixing element for mixing the feed accommodated in the container, which mixing element is fitted in the container so as to be drivable and rotatable about a substantially vertical rotation axis.

DE 20 2008 014 820 U1 discloses a feed-mixing wagon having a mixing container which is fitted on an undercarriage of the feed-mixing wagon. The mixing container comprises a bottom and a peripheral wall which extends upwards from the bottom. The mixing container is filled with feed via the open top side of the mixing container. In the mixing container, a mixing screw is fitted so as to be rotatable about a substantially vertical rotation axis. Against a bottom, ring-shaped part of the peripheral wall, a detachable wall covering of wear-resistant and/or corrosion-resistant material is fitted, for example stainless steel. The wall covering comprises, for example, a plurality of wall plate parts. On the bottom, a bottom covering is provided which is also made of a wear-resistant and/or corrosion-resistant material, such as stainless steel. During mixing, the feed is continually lifted up by the mixing screw, after which the feed drops down. The feed is also rotated in the mixing container. As in this case the feed scrapes across the bottom covering and along the wall covering, the material of the bottom and of the peripheral wall remains largely undamaged. The coverings which are screwed onto the mixing container slowly wear away during use. If the coverings are due to be replaced, the coverings are removed and replaced by new coverings. In order to provide protection against corrosive acids in the feed, the seams between the coverings and the mixing container are sealed using curing sealing material or are welded together. However, replacing the coverings is relatively laborious, which is particularly disadvantageous if the coverings have to be replaced relatively often.

It is an object of the invention to provide an improved feed-mixing wagon.

This object is achieved according to the invention by the fact that the wall plate parts each comprise two upwardly extending side edges, wherein the wall plate parts are arranged with these side edges adjoining each other, and wherein two adjoining side edges of at least two respective adjoining wall plate parts are clamped against the inner surface of the peripheral wall by means of clamping strips which overlap these adjoining side edges and which are attached to the peripheral wall of the container by means of detachable fasteners.

The feed-mixing wagon according to the invention comprises a container for receiving feed. The container is, for example, fitted on an undercarriage with wheels by means of which the feed-mixing wagon can move across the ground, for example the floor of an animal shed and/or the yard of a farm. The container comprises a bottom and a peripheral wall which is closed off at a bottom end by the bottom. The inner surface of the bottom is, for example, substantially circular or slightly oval, while the bottom edge of the peripheral wall has a corresponding shape. The peripheral wall flares upwards, for example the top edge of the peripheral wall is substantially elongate with rounded corners, such as oval. At a top end situated opposite the bottom, the container comprises a supply opening for supplying feed to the container. The supply opening is, for example, formed by the top edge of the peripheral wall. For the purpose of discharging mixed feed, the peripheral wall may comprise a lateral discharge opening which is closable by a hatch. A mixing element, for example a mixing screw, is arranged in the container so as to be rotatable about a rotation axis. The mixing element displaces the feed upwards from the bottom, after which the feed drops down again, and simultaneously the feed is turned over in the container by the rotating movement of the mixing screw. As a result thereof, the feed in the container is mixed.

The feed-mixing wagon according to the invention may have a small capacity, for example the volume of the container may be less than 3 m$^3$. In this case, it is necessary to fill the container with feed and mix the feed in the container relatively often, for example a plurality of times a day, such as 10 times a day or more. In order to protect the bottom part of the peripheral wall, a bottom, ring-shaped part of the inner surface of the peripheral wall is covered with a wall covering. During mixing, the feed scrapes along the wall covering of the container. As a result thereof, the material of the coverings is subjected to wear, whereas the material of the bottom or peripheral wall is not.

The wall covering extends, for example, from the bottom to a certain height above the bottom and runs around substantially completely. If the discharge opening is situated in the bottom, ring-shaped part of the inner surface of the peripheral wall, the wall covering continues over the hatch for closing off the discharge opening. The hatch is a movable part of the peripheral wall, the rest of the peripheral wall is fixed.

According to the invention, the wall covering comprises a plurality of wall plate parts which are fitted so as to adjoin each other by upwardly extending side edges which run, for example, substantially vertically. The wall plate parts have, for example, a thickness of at least 2 mm. For example, in each case the two adjoining side edges of two respective adjacent wall plate parts against the fixed peripheral wall are situated at a small distance apart in order to form a slot-shaped seam or intermediate space. Such dimensions are advantageous when fitting the wall plate parts, since the wall plate parts do not then, for example, come to rest on a weld seam of the container. The fact is that a weld seam is a thickening of the container and prevents the wall plate parts from resting flat against the container. At those locations where the container does not have a weld seam, the wall plate parts can lie closer together with a seam or intermediate space which is as small as possible. According to the invention, two adjoining side edges of at least two respective adjoining wall plate parts are clamped against the inner surface of the peripheral wall by clamping strips which overlap these adjoining side edges and which are attached to the peripheral wall of the container by means of detachable fasteners. The clamping strips run parallel to the upwardly extending side edges, for example also substantially vertically.

As the clamping strips bridge the seams between the side edges, it is not necessary to seal these seams using sealing compound or to weld them to each other. If the wall covering needs to be replaced after some time due to wear, the detachable fasteners, the clamping strips and the wall plate parts can simply be detached without having to remove sealing compound or welds. After the worn wall covering has been removed from the container, new replacement wall plate parts are attached to the peripheral wall of the container in order to produce a new replacement wall covering by means of the clamping strips, which may also be new, and the detachable fasteners, which may also be new. As a result, replacing the wall covering is very simple and fast.

In an embodiment of the invention, a bottom covering is also fitted, wherein the bottom is provided with a bottom covering which extends substantially across the entire inner surface of the bottom, wherein the bottom covering comprises at least one bottom plate part which is releasably attached to the bottom of the container. If the bottom covering and the wall covering need to be replaced after some time due to wear, the detachable fasteners, the clamping strips and the wall plate parts can simply be detached without sealing compound or welds having to be removed. Subsequently, the bottom covering can also be removed from the container. After the worn wall covering and worn bottom covering have been removed from the container, a new replacement bottom covering can be placed in the container. Thereafter, new replacement wall plate parts for forming a new replacement wall covering are attached to the peripheral wall of the container by means of the clamping strips, which may also be new, and the detachable fasteners, which may likewise be new. As a result, replacing the wall and bottom coverings is very simple and quick.

In an embodiment, the feed-mixing wagon is self-propelled, wherein the feed-mixing wagon is provided with a driving device for driving the feed-mixing wagon, in particular the wheels of the feed-mixing wagon, for moving the feed-mixing wagon across the ground, wherein the driving device is provided with a battery system for storing electrical energy and an electrical drive motor which is connected to the battery system. The invention is particularly advantageous with a self-propelled feed-mixing wagon. A self-propelled feed-mixing wagon is known per se. In contrast with other known feed-mixing wagons which are configured as trailers and are pulled by a tractor and have a volume of, for example, 30 m$^3$, this self-propelled feed-mixing wagon has a small capacity, the volume of the container being, for example, at most 2 or 3 m$^3$. With a self-propelled feed-mixing wagon, it is necessary to fill the container with feed and mix the feed in the container relatively often, for example 10 or more times a day, instead of only once a day. This results in accelerated wear of the container. In order to increase the service life, the thickness of the bottom and the peripheral wall of the container could be increased. However, the self-propelled feed-mixing wagon comprises a driving device for moving the feed-mixing wagon across the ground, for example the floor of an animal shed and/or the yard of a farm. The driving device is provided with a battery power supply for storing electrical energy and an electrical drive motor connected thereto. As the energy for moving the feed-mixing wagon is supplied by the battery power supply, it is desirable to keep the weight of the feed-mixing wagon low. This means that the bottom and peripheral wall of the container should preferably not be thick. In order to reduce the wear of the bottom and the peripheral wall, these could also be made of stainless steel. However, this is relatively expensive. Using the wall covering and the bottom covering according to the invention is therefore particularly advantageous with a self-propelled feed-mixing wagon.

In a preferred embodiment according to the invention, each of the clamping strips is provided with a stop face at its bottom end, wherein the at least one bottom plate part of the bottom covering is retained in the height direction between the stop faces of the clamping strips and the bottom for securing the bottom covering in the height direction. In this case, the clamping strips have a dual purpose: not only are the wall plate parts clamped against the inner surface of the peripheral wall by the clamping strips, but the clamping strips also prevent the bottom plate part or the bottom plate parts from moving upwards. Therefore the bottom covering is fastened in a form-fitted manner by the clamping strips and the bottom covering according to the invention does not have to be screwed onto the bottom. This facilitates fitting and removal of the bottom covering, so that replacing of the bottom covering can be carried out in a particularly simple and quick manner.

In an embodiment according to the invention, the bottom covering comprises a plurality of bottom plate parts which are arranged such that they adjoin each other and wherein each bottom plate part is provided with at least one recess which is situated adjacent to the peripheral wall, and wherein a bottom end of the clamping strips extends into the recesses of the bottom plate parts, wherein said bottom end is provided with two lateral stop edges which, viewed in the peripheral direction, extend on either side of the respective clamping strip in order to secure the bottom plate parts in the peripheral direction, and wherein the bottom plate parts are retained in the height direction between the stop faces of the clamping strips and the bottom in order to secure the bottom plate parts in the height direction. If the bottom covering is composed of a plurality of bottom plate parts, the bottom covering can easily be installed on the bottom and removed again during replacement. The bottom covering comprises, for example, two, three, four or more bottom plate parts. The bottom plate parts have, for example, a thickness of at least 2 mm.

In an embodiment of the invention, the clamping strips which extend into the recesses of the bottom plate parts with their bottom ends each comprise a lateral projection which protrudes in the peripheral direction above the bottom plate parts so as to form the stop face of said clamping strips in order to secure said bottom plate parts in the height direction. As a result thereof, each of the clamping strips can reliably secure both at least one of the bottom plate parts and at least one of the wall plate parts. The lateral projection of the clamping strips comprises, for example, a bottom edge which faces the bottom plates. The bottom edge of the lateral projection of the clamping strips runs above the top surface of the bottom plate parts with a small tolerance or bears against the top surface of the bottom plate parts. In this case, the stop face of each clamping strip is formed by the bottom edge of the lateral projection of said clamping strip. Underneath the lateral projection of said clamping strip are the lateral stop edges in order to secure a bottom plate part or two adjoining bottom plate parts in the peripheral direction.

In this case it is possible for each of the bottom plate parts to comprise two corners which are arranged adjacent to the peripheral wall, wherein the bottom plate parts in each case comprise a corner recess on these corners, and wherein the corner recesses of in each case two adjoining bottom plate parts together in each case form a compound recess, into which the clamping strips extend with a bottom end thereof, and wherein each of the bottom plate parts is retained in the peripheral direction between two lateral stop edges of two different clamping strips in order to secure the bottom plate parts in the peripheral direction.

The bottom covering is, for example, composed of bottom plate parts which, together, form a substantially circular or slightly oval bottom covering having a central opening for receiving a drive shaft of the mixing element. In this case, each bottom plate part may be provided with two substantially radially extending, straight side edges and an outer, curved peripheral edge which extends between said side edges and along the peripheral wall of the container. The peripheral edge and the side edges then form the two corners which are arranged adjacent to the peripheral wall. A corner recess is provided at each corner and forms a compound recess together with a corner recess of an adjacent bottom plate part through which a clamping strip extends. As a result thereof, the bottom plate parts are secured in the peripheral direction in a particularly reliable manner.

In this case, it is possible, according to the invention, for the clamping strips which extend into the compound recesses with their bottom ends to each comprise two lateral projections which protrude on either side of the respective clamping strips in the peripheral direction above two adjoining bottom plate parts so as to form the stop faces of said clamping strips in order to secure said bottom plate parts in the height direction. As a result thereof, the bottom plate parts are secured in the height direction in a particularly reliable manner.

The bottom and the peripheral wall of the container may be configured in different ways. Preferably, the bottom of the container and/or the peripheral wall of the container are made of standard steel (commercial steel), in particular low-carbon steel, for example with a carbon content of less than 0.3%. As a result thereof, the container can be produced in a simple and inexpensive manner. In this case, the wall plate parts and/or the bottom plate parts and/or the clamping strips may be made of stainless steel. As a result thereof, the coverings wear down relatively slowly during use of the feed-mixing wagon. However, it is also possible to use other materials, such as plastic, instead of stainless steel.

In an embodiment, the fasteners, by means of which the clamping strips are attached to the peripheral wall of the container, comprise bolt/nut connections. The bolts of the bolt/nut connections extend, for example, through first securing holes in the clamping strips and through second securing holes which are provided in the peripheral wall and are aligned with the first securing holes, wherein the side edges of the wall plate parts are arranged substantially adjacent to the second securing holes in order to form a seam between two adjoining wall plate parts, and wherein said seams are substantially completely covered by the clamping strips. This is advantageous for reliably attaching the wall covering and for closing off the wall covering.

In a further embodiment, the peripheral wall comprises two substantially flat parts which are connected to each other by a weld seam which extends, for example, substantially vertically, and wherein the securing holes of the second series are provided in one of the flat parts next to the weld seam. This results in a secure fastening of the clamping strips.

In a particular embodiment, each of the bottom plate parts comprises a radial projection which cooperates with the lateral projection of the clamping strips. The bottom plate parts together form a continuous, outer peripheral edge of the bottom covering. The bottom plate parts are dimensioned such that a ring-shaped tolerance is present between the continuous peripheral edge of the bottom plate parts and the peripheral wall of the container. The radial projection of the bottom plate parts protrudes with respect to said continuous peripheral edge, so that the lateral projection of the clamping strips can securely and reliably engage with said radial projection.

In this case, it is possible for the bottom and the peripheral wall to be connected to each other by a continuous weld seam, wherein the radial projection is provided with a slanting bottom edge in order to form a receiving space for a part of the continuous weld seam. Thus, the continuous weld seam is not in the way of the radial projections of the bottom plate parts.

In an embodiment, the wall covering comprises a moisture-proof seal which is provided between the wall plate parts and the peripheral wall. Preferably, the moisture-proof seal of the wall covering comprises a plurality of continuous, moisture-proof strips, each of which is arranged between in each case one of the wall plate parts and the peripheral wall of the container and each of which runs at a distance from and substantially parallel to the edge of said wall plate part. In an embodiment with a bottom covering, the bottom covering comprises a moisture-proof seal which is arranged between the at least one bottom plate part and the bottom. It is preferred if the moisture-proof seal of the bottom covering comprises at least one continuous, moisture-proof strip which is provided between the at least one bottom plate part and the bottom and each of which runs at a distance from and substantially parallel to the edge of said bottom plate part.

The moisture-proof strips are, for example, composed of a so-called "foam tape" which is configured to be, for example, adhesive on one side. Obviously, the "foam tape" may also be adhesive on both sides. The "foam tape" is, for example, made of PVC, PE or EPDM. When fitting the bottom covering and the wall covering, the continuous, moisture-proof strips are glued to the bottom and the peripheral wall of the container first. Then, the bottom plate parts are fitted in accordance with these strips, followed by the wall plate parts, so that the rear side of each plate part is sealed separately, that is to say no moisture can enter between the plate parts and the bottom or peripheral wall. As a result thereof, the risk of corrosion is reduced. In an embodiment, the peripheral wall of the container comprises a lateral discharge opening which is closable by a hatch, wherein the discharge opening is provided with two substantially vertical side edges and an intermediate bottom edge which is in one plane with the bottom of the container, and wherein at least one bottom plate part comprises a protruding edge part which protrudes above the bottom edge of the discharge opening, wherein said protruding edge part is provided with two stop edges which, viewed in the peripheral direction, extend on either side of the protruding edge part, and wherein said bottom plate part with said stop edges is retained in the peripheral direction between the side edges of the discharge opening. The side edges of the discharge opening may be used as a stop face for securing a bottom plate part in the peripheral direction.

In this case, it is possible for a respective clamping strip to be attached to the peripheral wall along each side edge of the discharge opening in order to clamp two respective wall plate parts which are arranged on either side of the discharge opening, wherein the bottom plate part is retained with the protruding edge part in the height direction between the stop faces of said clamping strips and the bottom in order to secure said bottom plate part in the height direction. The clamping strips along the side edges of the discharge opening secure the bottom plate part with the protruding edge part in the height direction, while said bottom plate part is already secured in the peripheral direction by the side edges of the discharge opening.

The invention also relates to a method for replacing a wall covering of a feed-mixing wagon which is provided with:

a container for receiving feed, which container is provided with a bottom, and a peripheral wall which is closed off at a bottom end by the bottom, wherein the container is provided, at a top end situated opposite the bottom, with a supply opening for supplying feed to the container, wherein the bottom and the peripheral wall each comprise an inner surface which extends in the container, and wherein the peripheral wall is provided with the wall covering which extends at least along a bottom, ring-shaped part of the inner surface of the peripheral wall, and wherein the wall covering comprises a plurality of wall plate parts, each of which comprises two upwardly extending side edges, and wherein the wall plate parts are arranged with these side edges adjoining each other, and two adjoining side edges of at least two respective adjoining wall plate parts are clamped against the inner surface of the peripheral wall by means of clamping strips which overlap these adjoining side edges and which are attached to the peripheral wall of the container by means of detachable fasteners, a mixing element for mixing the feed accommodated in the container, which mixing element is fitted in the container so as to be drivable and rotatable about a rotation axis, the method comprising:

removing the detachable fasteners, followed by the removal of the clamping strips and the wall plate parts of the wall covering, and subsequently fitting replacement wall plate parts which are clamped against the inner surface of the peripheral wall by means of the clamping strips, which may also have been replaced, wherein the clamping strips are attached to the peripheral wall by means of the detachable fasteners, which may also have been replaced.

The invention will now be explained in more detail by means of an exemplary embodiment illustrated in the figures, in which:

FIGS. 4a, 4b show perspective views of wall plate parts of a wall covering which is fitted against the peripheral wall of the container illustrated in FIG. 2.

FIGS. 5a-5d show perspective views of clamping strips for clamping the wall plate parts against the peripheral wall and for retaining the bottom plate parts on the bottom of the container illustrated in FIG. 2.

Figure 1:
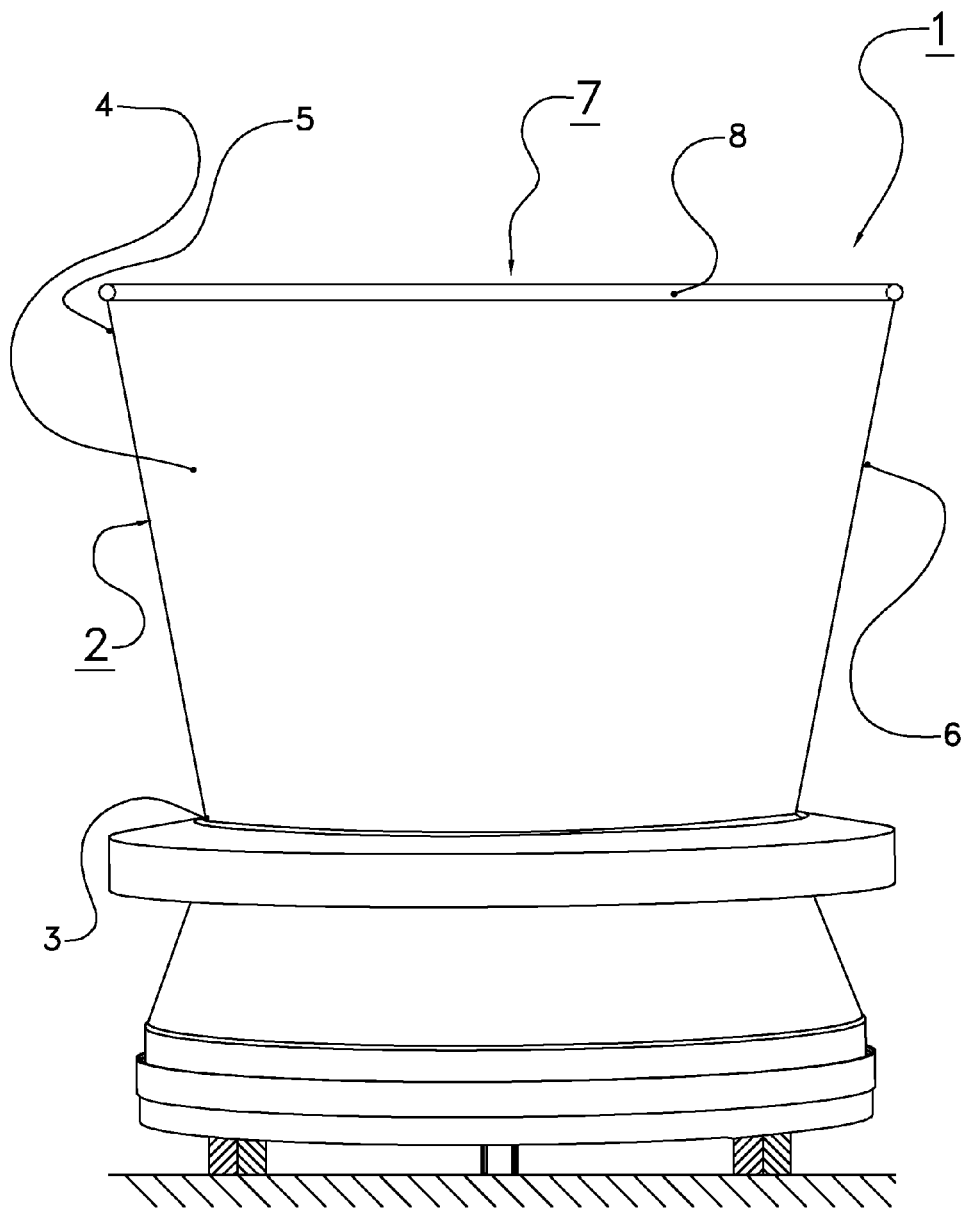
FIG. 1 shows a perspective view of a self-propelled feed-mixing wagon according to the invention.

In FIG. 1, the self-propelled feed-mixing wagon is denoted overall by reference numeral 1. The feed-mixing wagon 1 comprises an undercarriage with wheels (not shown), so that the feed-mixing wagon 1 can be moved across the ground, for example the floor of an animal shed and/or the yard of a farm. The feed-mixing wagon 1 comprises a driving device (not shown) for driving the wheels of the feed-mixing wagon. The driving device is provided with a battery system for storing electrical energy and an electrical drive motor which is connected to the battery system.

A container 2 for receiving feed is arranged on the undercarriage. In this exemplary embodiment, the container 2 has a small capacity, for example the volume of the container 2 is smaller than 3 m$^3$. The container 2 comprises a bottom 3 and an upright peripheral wall 4 which is closed off at a bottom end by the bottom 3. In this exemplary embodiment, the bottom 3 and the peripheral wall 4 are made of steel. In this exemplary embodiment, the inner surface of the bottom 3 is in the shape of a flattened circle. The peripheral wall 4 of the container 2 has a bottom edge which is connected to the bottom 3 by means of a continuous weld seam.

The upright peripheral wall 4 of the container 2 has a height of, for example, 1-2 m. The peripheral wall 4 comprises a front part 5 and a rear part 6, each of which is substantially in the shape of a half cylinder. The front part 5 and rear part 6 each have triangular flat parts, so that the peripheral wall 4 flares upwards. The front and rear part 5 and 6, of the peripheral wall 4 are connected to each other by weld seams which run, for example, substantially vertically.

In this exemplary embodiment, the top edge 8 of the peripheral wall 4 is substantially oval or elliptical, i.e. the top edge 8 is composed of two parallel straight parts and two round parts in the shape of a half circle. The top edge 8 of the peripheral wall 4 defines a supply opening 7 for supplying feed to the container 2. In order to fill the container 2 with feed, the feed is poured into the supply opening 7 from above.

Figure 2:
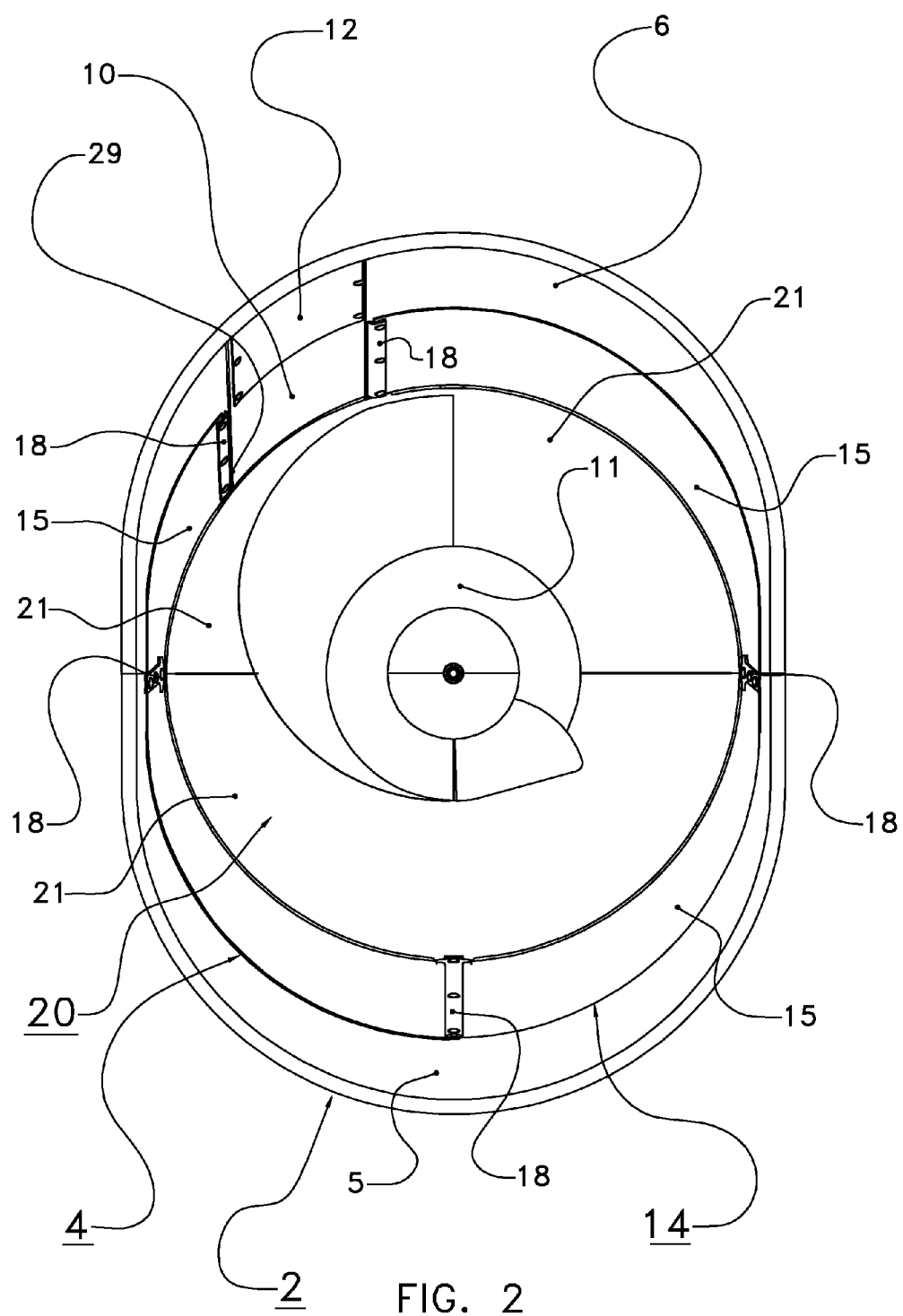
FIG. 2 shows a top view of the container for receiving feed of the feed-mixing wagon illustrated in FIG. 1.

Inside the container 2, there is a mixing element which, in this exemplary embodiment, is configured as a mixing screw 11 (see FIG. 2). The mixing screw 11 is fitted on the inner surface of the bottom 3. The mixing screw 11 is drivable and rotatable about a substantially vertical rotation axis. During use, the mixing screw 11 moves the feed upwards, for example up to a height of approximately 40-50 cm, after which the feed drops down again, and at the same time the feed is turned over in the interior of the container 2 as a result of the rotating movement of the mixing screw 11. As a result thereof, the feed in the container 2 is mixed.

A bottom, ring-shaped part of the peripheral wall 4 of the container 2 comprises a discharge opening 10 which is closable by means of a hatch 12. The discharge opening 10 comprises two substantially vertical side edges 29 and a bottom edge 30 which is substantially in one plane with the bottom 3 of the container 2. When the feed in the container 2 has been mixed sufficiently well, the hatch 12 is opened and the mixed feed is discharged from the container 2.

As the container 2 in this exemplary embodiment has a small capacity, it is necessary to fill the container 2 relatively often, for example a plurality of times a day, such as 10 or more times a day, with feed and to mix the feed in the container 2. In order to protect the inner surface of the bottom 3 and the inner surface of the bottom, ring-shaped part of the peripheral wall 4 of the container 2, a bottom covering 20 is arranged over substantially the entire inner surface of the bottom 3 and the bottom, ring-shaped part of the inner surface of the peripheral wall 4 is covered with a wall covering 14. The wall covering 14 runs across the hatch 12. During the mixing, the feed scrapes across the bottom covering 20 and along the wall covering 14 of the container 2. As a result thereof, no wear of the material of the bottom 3 or peripheral wall 4 itself occurs, but only the material of the coverings 20, 14 is subjected to wear.

In this exemplary embodiment, the wall covering 14 comprises a plurality of wall plate parts 15 which are made, for example, of stainless steel. The wall plate parts 15 have a thickness of, for example, at least 2 mm. The wall plate parts 15 are arranged adjacent to each other with substantially vertical side edges 16. In this case, the two adjoining side edges 16 of two respective adjacent wall plate parts 15 are a small distance apart in each case in order to produce a slot-shaped seam or intermediate space in between in each case. It is not necessary to place the wall plate parts 15 against each other with a close fit, thus making it easier to fit the wall plate parts 15.

According to the invention, the two adjoining side edges 16 of at least two respective adjacent wall plate parts 15 are clamped against the inner surface of the peripheral wall 4 by substantially vertical clamping strips 18 which overlap these side edges 16 and which are attached to the peripheral wall 4 of the container 2 by means of detachable fasteners (not shown). These are the adjacent wall plate parts 15 which are attached to the fixed peripheral wall and not to the movable hatch. The clamping strips 18 are also illustrated in FIGS. 5a-5d. Due to the fact that the clamping strips 18 overlap the side edges 16 of the wall plate parts 15, the slot-shaped seams in between are bridged and covered by the clamping strips 18. When the feed is being mixed in the container 2, the clamping strips 18 prevent the feed from collecting behind the wall plate parts 15.

Next to each side edge 29 of the discharge opening 10, a respective clamping strip 18 is also attached to the peripheral wall 4 of the container 2 for clamping two respective wall plate parts 15 which are arranged on either side of the discharge opening 10. These edge-clamping strips thus overlap a side edge 16 of a wall plate part. The hatch 12 for closing off the discharge opening 10 is also covered with a wall plate part 15, however, without the use of a clamping strip. The hatch is movable and thus not a fixed peripheral wall, but a movable peripheral wall.

In this exemplary embodiment, the fasteners for attaching the clamping strips 18 to the peripheral wall 4 of the container 2 comprise bolt/nut connections, for example carriage bolts. The clamping strips 18 are provided with a series of first securing holes 19 for receiving the head of the carriage bolts. The carriage bolts extend through these first securing holes of the clamping strips 18 and through second securing holes in the peripheral wall 4 which are aligned therewith, and are fixed on the outside of the peripheral wall 4 by means of nuts (not shown). Preferably, the second securing holes are provided in the flat parts of the peripheral wall 4 next to a weld seam. This results in a strong connection.

The wall covering 14 furthermore comprises a moisture-proof seal (not shown) which is arranged between the wall plate parts 15 and the peripheral wall 4 of the container 2. The moisture-proof seal of the wall covering 14 comprises, for example, a plurality of continuous, moisture-proof strips of "foam tape", each of which is arranged between in each case one of the wall plate parts 15 and the peripheral wall 4 of the container 2 and each of which runs at a distance from and substantially parallel to the edge of said wall plate part 15. The moisture-proof strips reduce the formation of corrosion on the peripheral wall 4 behind the wall plate parts 15.

The wall plate parts 15 illustrated in FIG. 4a are fitted on the inside of the peripheral wall 4 of the front part 5 of the container 2, the front part 5 comprises hatch 12, and on the inner wall parts situated on either side of the opening 11. The wall plate parts 15 illustrated in FIG. 4b are fitted on the inside of the peripheral wall 4 of the rear part 6 of the container. The wall plate parts 15 to be attached to the hatch or to be attached to inner wall parts on either side of the opening 11 are provided with third securing holes 17. In order to attach the wall plate part 15 to the hatch 11, the bolts are pushed through the third securing holes of the wall plate part and through the second securing holes in the hatch 11. In order to attach a wall plate part 15 on the side edge of the discharge opening 29, the bolts are pushed through the first securing holes 19 of the clamping strips (from FIG. 5c), then through the third securing holes 17 of the wall plate part and finally through the second securing holes in the side edge of the discharge opening 29. At locations where two adjoining side edges of two adjoining wall plate parts are provided and clamped by means of an overlapping clamping strip, one of the side edges is provided with recesses 27 which provide space for the bolts. The clamping strips 18 are also illustrated in FIGS. 5a-5d. Due to the fact that the clamping strips 18 overlap the side edges 16 of the wall plate parts 15, the slot-shaped seams in between are bridged and covered by the clamping strips 18. During mixing of the feed in the container 2, the clamping strips 18 prevent feed from being able to collect behind the wall plate parts 15. The clamping strips which clamp the side edges of the wall plate parts at the side edge 29 of the discharge opening 10 also cover an intermediate space between this wall plate part and the side edge 29.

In this exemplary embodiment, the bottom covering 20 comprises two bottom plate parts 21 which are made, for example, from stainless steel. The bottom plate parts 21 have a thickness, for example, of at least 2 mm. Obviously, more or fewer bottom plate parts 21 may be used, for example a single bottom plate part or three or four bottom plate parts 21. The first bottom plate part 21 illustrated in FIG. 3b is fitted adjacent to the discharge opening 10, while the second bottom plate part 21 illustrated in FIG. 3a is positioned adjacent to the first bottom plate part 21 in order to cover substantially the entire inner surface of the bottom 3.

The bottom plate parts 21 each comprise a plurality of recesses 22 which are situated adjacent to the peripheral wall 4 of the container 2. The bottom plate parts 21 illustrated in FIGS. 3a and 3b each comprise two corner recesses 22 at both corners of the bottom plate parts 21. When the bottom plate parts 21 are situated on the bottom 3, the adjoining corner recesses 22 of the two bottom plate parts 21 together in each case form a compound recess along the peripheral wall 4 of the container 2. The bottom end of one of the clamping strips 18 is inserted in each case in those compound recesses. Each of the bottom plate parts 21 is retained between two lateral stop edges 25 of two different clamping strips 18 in the peripheral direction in order to secure the bottom plate parts 21 in the peripheral direction.

Figure 3A:
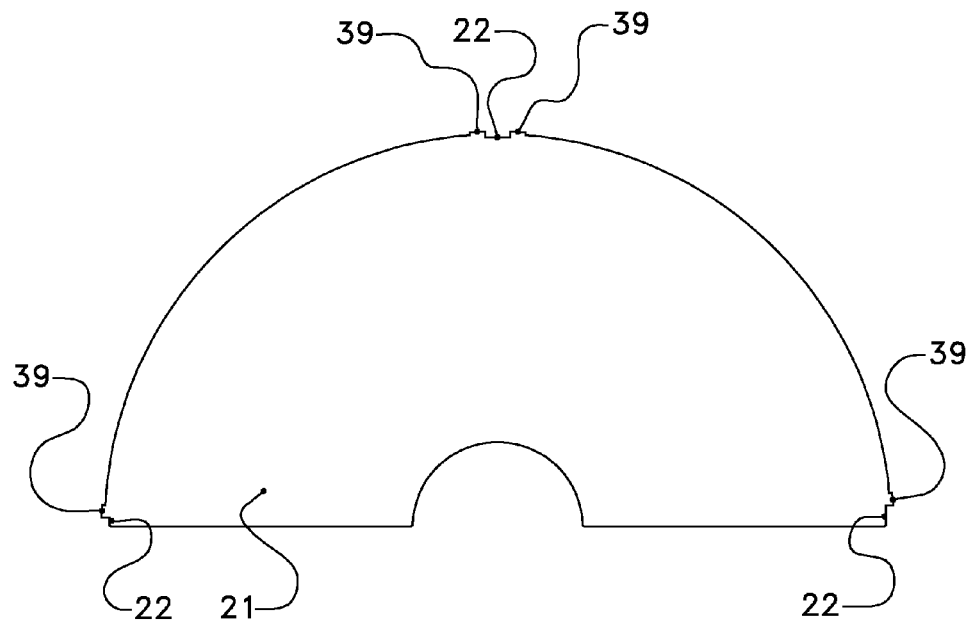
FIGS. 3a, 3b show top views of bottom plate parts of a bottom covering which is arranged on the bottom of the container illustrated in FIG. 2.
Figure 3B:
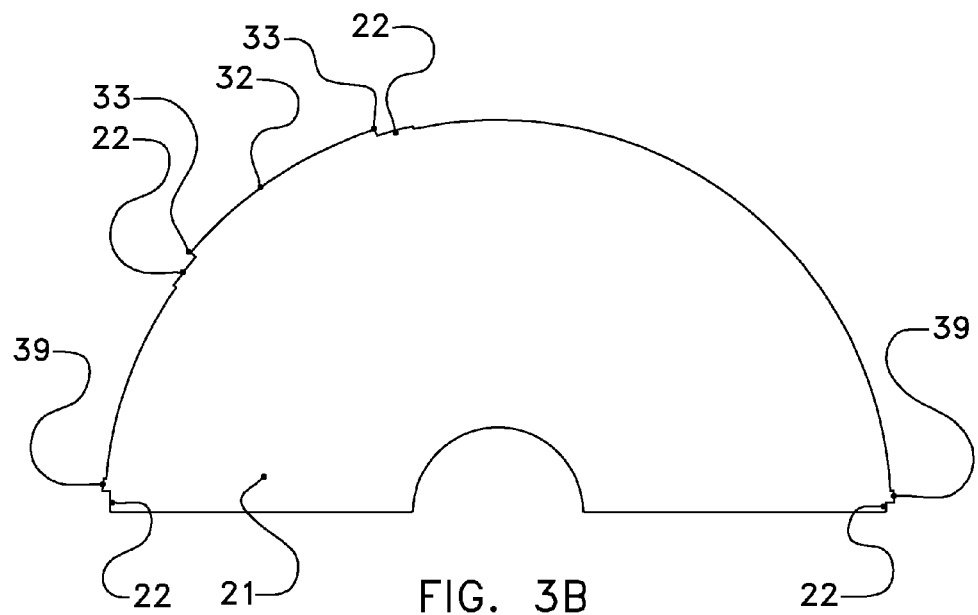

Furthermore, the bottom plate part 21 illustrated in FIG. 3a comprises an additional recess 22 for receiving the bottom end of one of the clamping strips 18. This bottom plate part 21 is thus also secured in the peripheral direction by the bottom end of this clamping strip 18. The bottom plate part 21 illustrated in FIG. 3b comprises two additional recesses 22 for receiving the bottom ends of the clamping strips 18 which are attached along the side edges 29 of the discharge opening 10. In between, this bottom plate part 21 comprises a protruding edge part 32 which protrudes beyond the bottom edge 30 of the discharge opening 10. Thus, the protruding edge part 32 forms two stop edges 33. The bottom plate part 21 illustrated in FIG. 3b is also retained by these stop edges 33 in the peripheral direction between the side edges 29 of the discharge opening 10.

At their bottom end, the clamping strips 18 comprise a stop face 23. The bottom plate parts 21 are retained in the height direction between the stop faces 23 of the clamping strips 18 and the bottom 3 in order to secure these bottom plate parts 21 in the height direction. In this exemplary embodiment, the clamping strips 18 illustrated in FIGS. 5a and 5*b* each comprise two lateral projections 24 which protrude beyond the two adjoining bottom plate parts 21 on either side of the respective clamping strips 18 in the peripheral direction in order to form the stop faces 23. The clamping strip 18 illustrated in FIG. 5*c* comprises only a single lateral projection 24, while the clamping strip 18 illustrated in FIG. 5*d* does not comprise a lateral projection 24.

In order to ensure that the stop faces 23 of the clamping strips 18 engage with the bottom plate parts 21, each of the bottom plate parts 21 may comprise a radial projection 39 which cooperates with the lateral projection 24. The radial projection may have a slanting bottom edge in order to create a receiving space underneath the bottom plate parts 21 for a part of the continuous weld seam between the bottom 3 and the peripheral wall 4 of the container 2.

In this exemplary embodiment, the clamping strips 18 therefore have a dual purpose: not only do the clamping strips 18 clamp the wall plate parts 15 against the inner surface of the peripheral wall 4 of the container 2, but the clamping strips 18 also prevent the bottom plate parts 21 from becoming detached by an upward movement. The bottom plate parts 21 are therefore attached by the clamping strips 18 in a form-fitted manner and it is not necessary to screw the bottom plate parts 21 onto the bottom 3.

The bottom covering 20 furthermore comprises a moisture-proof seal (not shown) which is provided between the bottom plate parts 21 and the bottom 3. The moisture-proof seal of the bottom covering 20 comprises two continuous, moisture-proof strips of "foam tape", each of which is provided between in each case one of the bottom plate parts 21 and the bottom 3 and each of which runs at a distance from and substantially parallel to the edge of this bottom plate part 21. The moisture-proof strips reduce the formation of corrosion on the bottom 3 underneath the bottom plate parts 21.

If the bottom covering and/or wall covering needs to be replaced after some time due to wear, the bolt connections, the clamping strips 18 and the wall plate parts 14 can be removed in a simple manner. Subsequently, the bottom plate parts 21 can also be removed from the container 2. After the worn wall covering and worn bottom covering have been removed from the container 2, new replacement bottom plate parts can be provided in the container 2. Thereafter, new replacement wall plate parts are attached to the peripheral wall 4 of the container 2 by means of the clamping strips, which may also be new, and the bolt connections, which may likewise be new. In this case, the new replacement bottom plate parts 21 are again retained in the height direction by the clamping strips 18. As a result thereof, replacing the coverings can be carried out in a particularly simple and quick manner.

The invention is not limited to the exemplary embodiment illustrated in the figures. The person skilled in the art may make various modifications which fall within the scope of the invention. For example, the mixing element may be a mixing element which is fitted so as to be rotatable about a substantially horizontal rotation axis instead of a substantially vertical rotation axis. Also, the arch-shaped edge of the bottom part 21 may be formed without radial projections 39, this being a variant on the configuration illustrated in FIG. 3A in which the recesses 22 are delimited by radial projections 39.

The invention claimed is:

1. A feed-mixing wagon, comprising:
    a container for receiving feed, the container being provided with a bottom and a peripheral wall that is closed off at a bottom end thereof by the bottom, wherein the container is provided, at a top end situated opposite the bottom, with a supply opening for supplying feed to the container, wherein the bottom and the peripheral wall each comprise an inner surface extending in the container, wherein the peripheral wall is provided with a wall covering extending at least along a bottom, ring-shaped part of the inner surface of the peripheral wall, and wherein the wall covering comprises a plurality of wall plate parts; and
    a mixing element for mixing the feed accommodated in the container, the mixing element being fitted in the container so as to be drivable and rotatable about a substantially vertical rotation axis,
    wherein the wall plate parts each comprise two upwardly extending side edges, and wherein the wall plate parts are arranged with the extending side edges adjoining each other, and wherein two adjoining side edges of at least two respective adjoining wall plate parts are clamped against the inner surface of the peripheral wall by clamping strips that overlap the adjoining side edges and that are attached to the peripheral wall of the container by detachable fasteners.

2. The feed-mixing wagon according to claim 1, wherein the bottom is provided with a bottom covering extending substantially across an entire inner surface of the bottom, and wherein the bottom covering comprises at least one bottom plate part releasably attached to the bottom of the container.

3. The feed-mixing wagon according to claim 2, wherein each of the clamping strips is provided with a stop face at a bottom end thereof, and wherein the at least one bottom plate part of the bottom covering is retained in a height direction between the stop face of the clamping strip and the bottom for securing the bottom covering in the height direction.

4. The feed-mixing wagon according to claim 3, wherein the bottom covering comprises a plurality of bottom plate parts arranged such that the bottom plate parts adjoin each other and wherein each bottom plate part is provided with at least one recess situated adjacent to the peripheral wall of the container, and wherein a bottom end of the clamping strips extends into the recesses of the bottom plate parts, wherein said bottom end is provided with two lateral stop edges which, viewed in a peripheral direction, extend on either side of a respective clamping strip in order to secure the bottom plate parts in the peripheral direction, and wherein each of the bottom plate parts is retained in the height direction between the stop faces of the clamping strips and the bottom in order to secure the bottom plate parts in the height direction.

5. The feed-mixing wagon according to claim 4, wherein the clamping strips that extend into the recesses of the bottom plate parts with bottom ends of the clamping strips thereof each comprise a lateral projection protruding in the peripheral direction above the bottom plate parts so as to form the stop face of said clamping strips in order to secure said bottom plate parts in the height direction.

6. The feed-mixing wagon according to claim 4, wherein the bottom plate parts each comprise two corners arranged adjacent to the peripheral wall, and wherein the bottom plate parts in each case comprise a corner recess on the corners, and wherein the corner recesses of, in each case, two adjoining bottom plate parts together, in each case, form a compound recess, into which the clamping strips extend with a bottom end thereof, and wherein each of the bottom plate parts is retained in the peripheral direction between two lateral stop edges of two different clamping strips in order to secure the bottom plate parts in the peripheral direction.

7. The feed-mixing wagon according to claim 6, wherein the clamping strips that extend into the compound recesses with the bottom ends of the clamping strips thereof each comprise two lateral projections protruding on either side of the respective clamping strips in the peripheral direction above, in each case, two adjoining bottom plate parts so as to form the stop faces of said clamping strips in order to secure said bottom plate parts in the height direction.

8. The feed-mixing wagon according to claim 1, wherein the wall plate parts and/or the clamping strips are made of stainless steel.

9. The feed-mixing wagon according to claim 1, wherein the bottom of the container and/or the peripheral wall of the container are made of low-carbon steel with a carbon content of less than 0.3%.

10. The feed-mixing wagon according to claim 1, wherein the fasteners, by which the clamping strips are attached to the peripheral wall of the container, comprise bolt/nut connections, and wherein the bolts of the bolt/nut connections extend through first securing holes in the clamping strips and through second securing holes provided in the peripheral wall and aligned with the first securing holes, and wherein the side edges of the wall plate parts are arranged substantially adjacent to the second securing holes in order to form a seam between, in each case, two adjoining wall plate parts, and wherein said seams are substantially completely covered by the clamping strips.

11. The feed-mixing wagon according to claim 1, wherein the peripheral wall of the container comprises two substantially flat parts connected to each other by a weld seam, and wherein the fasteners, by which the clamping strips are attached to the peripheral wall of the container, comprise bolt/nut connections, and wherein the bolts of the bolt/nut connections extend through first securing holes in the clamping strips and through second securing holes provided in one of the flat parts next to the weld seam and aligned with the first securing holes.

12. The feed-mixing wagon according to claim 5, wherein each of the bottom plate parts comprises a radial projection that cooperates with the lateral projection of the clamping strips.

13. The feed-mixing wagon according to claim 12, wherein the bottom and the peripheral wall of the container are connected to each other by a continuous weld seam, and wherein the radial projection is provided with a slanting bottom edge in order to form a receiving space underneath the bottom plate parts for a part of the continuous weld seam.

14. The feed-mixing wagon according to claim 1, wherein the wall covering is provided with a moisture-proof seal provided between the wall plate parts and the peripheral wall of the container.

15. The feed-mixing wagon according to claim 14, wherein the moisture-proof seal of the wall covering comprises a plurality of continuous, moisture-proof strips, each being arranged between, in each case, one of the wall plate parts and the peripheral wall of the container and each of running at a distance from and substantially parallel to the edge of said wall plate part.

16. The feed-mixing wagon according to claim 2, wherein the peripheral wall of the container comprises a lateral discharge opening that is closable by a hatch, wherein the discharge opening is provided with two substantially vertical side edges and an intermediate bottom edge substantially in one plane with the bottom of the container, and wherein at least one bottom plate part comprises a protruding edge part protruding above the bottom edge of the discharge opening wherein said protruding edge part is provided with two stop edges which, viewed in a peripheral direction, extend on either side of the protruding edge part, and wherein said bottom plate part with said stop edges is retained in the peripheral direction between the side edges of the discharge opening.

17. The feed-mixing wagon according to claim 16, wherein a respective clamping strip is attached to the peripheral wall of the container along each side edge of the discharge opening in order to clamp two respective wall plate parts that are arranged on either side of the discharge opening, and wherein the bottom plate part is retained with the protruding edge part between the stop faces of said clamping strips and the bottom in order to secure said bottom plate part in a height direction.

18. The feed-mixing wagon according to claim 1, wherein the container has a volume of less than 3 $m^3$.

19. The feed-mixing wagon according to claim 1, wherein the container has a height of 1-2 m, and the wall plate parts are at least 40 cm high.

20. Method A method for replacing a wall covering of a feed-mixing wagon, the feed mixing wagon being provided with:
   a container for receiving feed, the container being provided with a bottom, and a peripheral wall that is closed off at a bottom end thereof by the bottom, wherein the container is provided, at a top end situated opposite the bottom, with a supply opening for supplying feed to the container, wherein the bottom and the peripheral wall each comprise an inner surface extending in the container, wherein the peripheral wall is provided with a wall covering extending at least along a bottom, ring-shaped part of the inner surface of the peripheral wall, and wherein the wall covering comprises a plurality of wall plate parts, each of the wall plate parts comprising two upwardly extending side edges, and wherein the wall plate parts are arranged with the extending side edges adjoining each other, and two adjoining side edges of at least two respective adjoining wall plate parts are clamped against the inner surface of the peripheral wall by clamping strips that overlap the adjoining side edges and that are attached to the peripheral wall of the container by detachable fasteners; and
   a mixing element for mixing the feed accommodated in the container, the mixing element being fitted in the container so as to be drivable and rotatable about a rotation axis,
   wherein the method comprises the steps of:
     removing the detachable fasteners, followed by the removal of the clamping strips and the wall plate parts of the wall covering; and
     subsequently fitting replacement wall plate parts that are clamped against the inner surface of the peripheral wall by the clamping strips, which may also have been replaced, wherein the clamping strips are attached to the peripheral wall by the detachable fasteners, which may also have been replaced.

* * * * *